United States Patent
Silberman et al.

(10) Patent No.: US 11,556,638 B1
(45) Date of Patent: Jan. 17, 2023

(54) SYSTEMS AND METHODS FOR INTELLIGENT CYBERSECURITY ALERT SIMILARITY DETECTION AND CYBERSECURITY ALERT HANDLING

(71) Applicant: Expel, Inc., Herndon, VA (US)

(72) Inventors: Peter Silberman, Rockville, MD (US); Dan Whalen, Fairfax, VA (US); Matt Berninger, Denver, CO (US); Paul Diebold, Lake Oswego, OR (US); Ben Kawecki, Arlington, VA (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 17/850,328

(22) Filed: Jun. 27, 2022

Related U.S. Application Data

(60) Provisional application No. 63/239,716, filed on Sep. 1, 2021, provisional application No. 63/223,244, filed on Jul. 19, 2021.

(51) Int. Cl.
| | | |
|---|---|---|
| *G06F 21/55* | (2013.01) | |
| *G06F 21/60* | (2013.01) | |
| *G06F 21/57* | (2013.01) | |
| *G06F 21/56* | (2013.01) | |

(52) U.S. Cl.
CPC .......... *G06F 21/554* (2013.01); *G06F 21/564* (2013.01); *G06F 21/577* (2013.01); *G06F 21/602* (2013.01)

(58) Field of Classification Search
CPC .... G06F 21/554; G06F 21/564; G06F 21/577; G06F 21/602
See application file for complete search history.

(56) References Cited

U.S. PATENT DOCUMENTS

| | | | | |
|---|---|---|---|---|
| 10,250,623 | B1* | 4/2019 | Patton | G06F 21/554 |
| 2016/0065613 | A1* | 3/2016 | Cho | H04L 63/1416 |
| | | | | 726/23 |
| 2016/0080173 | A1* | 3/2016 | Quick | G06Q 30/0202 |
| | | | | 705/7.31 |

(Continued)

*Primary Examiner* — Ali S Abyaneh
(74) *Attorney, Agent, or Firm* — Chandler Scheitlin; Pathowitz Alce; Alce PLLC

(57) ABSTRACT

A system and method for generating event-specific handling instructions for accelerating a threat mitigation of a cybersecurity event includes identifying a cybersecurity event; generating a cybersecurity event digest based on the cybersecurity event, computing a cybersecurity hashing-based signature of the cybersecurity event based on the cybersecurity event digest; searching, based on the distinct cybersecurity hashing-based signature of the cybersecurity event, an n-dimensional space comprising a plurality of historical cybersecurity event hashing-based signatures; returning one or more historical cybersecurity events or historical cybersecurity alerts homogeneous to the cybersecurity event based on the search; deriving one or more cybersecurity event-specific handling actions for the cybersecurity event based on identifying a threat handling action corresponding to each of the one or more historical cybersecurity events or historical cybersecurity alerts homogeneous to the cybersecurity event; and executing one or more cybersecurity threat mitigation actions to resolve or mitigate the cybersecurity event.

20 Claims, 11 Drawing Sheets

(56) References Cited

U.S. PATENT DOCUMENTS

2016/0191558 A1\* 6/2016 Davison ................ H04L 63/145
                                                                               726/1
2021/0258329 A1\* 8/2021 Clayton ................ H04L 9/3239
2021/0281604 A1\* 9/2021 Gadhe ................... H04L 63/145

\* cited by examiner

200

```
┌ ─ ─ ─ ─ ─ ─ ─ ─ ─ ─ ─ ─ ─ ─ ─ ┐
│  Constructing one or more N-Dimensional Spaces S205  │
└ ─ ─ ─ ─ ─ ─ ─ ─ ─ ─ ─ ─ ─ ─ ─ ┘
```

Identifying Inbound Alert and/or Event Data S210

Converting Inbound Alert or Event Data into Vector Representations S220

Evaluating Inbound Alerts/Events or Alert/Event Representations Against one or more Alert Spaces S230

Generating one or more Proposed Actions for one or more Inbound Alerts and/or Events S240

FIGURE 2

INBOUND ALERT 1

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.src_user.username.email', 'user1@company.com'),
('user_evidence.dst_user.username.username', 'android_emm_uem@company.com'),
('user_evidence.dst_user.username.email', 'android_emm_uem@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

INBOUND ALERT 2

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.dst_user.username.username', 'admin_user1@company.com'),
('user_evidence.dst_user.username.email', 'admin_user1@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

FIGURE 3

INBOUND ALERT 1

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.src_user.username.email', 'user1@company.com'),
('user_evidence.dst_user.username.username', 'android_emm_uem@company.com'),
('user_evidence.dst_user.username.email', 'android_emm_uem@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)

ABRIDGED ALERT DIGEST

7922 US android_emm_uem company.com comcast cable communications inc isp user1 company.com us

INBOUND ALERT 2

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.dst_user.username.username', 'admin_user1@company.com'),
('user_evidence.dst_user.username.email', 'admin_user1@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

ABRIDGED ALERT DIGEST

7922 US admin_user1 company.com comcast cable communications inc isp user1 company.com us

FIGURE 4

INBOUND ALERT 1

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.src_user.username.email', 'user1@company.com'),
('user_evidence.dst_user.username.username', 'android_emm_uem@company.com'),
('user_evidence.dst_user.username.email', 'android_emm_uem@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)

ABRIDGED ALERT DIGEST

↓

7922 US android_emm_uem company.com comcast cable communications inc isp user1 company.com us

ALERT REPRESENTATION

↓

HASH SIGNATURE OR EMBEDDED REPRESENTATION OF ALERT DIGEST

INBOUND ALERT 2

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.dst_user.username.username', 'admin_user1@company.com'),
('user_evidence.dst_user.username.email', 'admin_user1@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

ABRIDGED ALERT DIGEST

↓

7922 US admin_user1 company.com comcast cable communications inc isp user1 company.com us

ALERT REPRESENTATION

↓

HASH SIGNATURE OR EMBEDDED REPRESENTATION OF ALERT DIGEST

| Assigned to: Expel | Evidence Summary | Close | Add To | Investigate |

HIGH
Suspicious use of instance profile credentials

Ruxie says:
I found 7 similar alerts closed as BENIGN.
Example alerts:
- Suspicious use of instance profile credentials
- Suspicious use of instance profile credentials
- Suspicious use of instance profile credentials If this alert looks similar, consider closing this alert.

[Close as Benign]

FIGURE 10

SYSTEMS AND METHODS FOR INTELLIGENT CYBERSECURITY ALERT SIMILARITY DETECTION AND CYBERSECURITY ALERT HANDLING

CROSS-REFERENCE TO RELATED APPLICATIONS

This application claims the benefit of U.S. Provisional Application No. 63/239,716, filed 1 Sep. 2021 and U.S. Provisional Application No. 63/223,244, filed 19 Jul. 2021, which are incorporated in their entireties by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF SUMMARY OF THE INVENTION(S)

In one embodiment, a method for automatically generating event-specific handling instructions for accelerating a threat mitigation of a cybersecurity event includes identifying a target cybersecurity event comprising a plurality of distinct pieces of event metadata; automatically generating, by one or more computers, a text-based cybersecurity event digest based on the target cybersecurity event, wherein the generating the text-based cybersecurity event digest includes: selectively extracting a digest corpus comprising a subset of indicative metadata features from the plurality of distinct pieces of event metadata that characterize the target cybersecurity event; and automatically composing the subset of indicative metadata features into at least one string of text based on one or more cybersecurity metadata arrangement heuristics; computing, via a cybersecurity event hashing algorithm, a cybersecurity hashing-based signature of the target cybersecurity event based on the text-based cybersecurity event digest; searching, based on the cybersecurity hashing-based signature of the target cybersecurity event, an n-dimensional space comprising a plurality of historical cybersecurity event hashing-based signatures corresponding to a plurality of historical cybersecurity events; returning one or more historical cybersecurity events or historical cybersecurity alerts homogeneous to the target cybersecurity event based on the search; deriving, by the one or more computers, one or more cybersecurity event-specific handling actions for the target cybersecurity event based on identifying a threat handling action corresponding to each of the one or more historical cybersecurity events or historical cybersecurity alerts homogeneous to the target cybersecurity event; and executing, by the one or more computers, one or more cybersecurity threat mitigation actions corresponding to the one or more cybersecurity event-specific handling actions to resolve or mitigate the target cybersecurity event.

In one embodiment, the method includes wherein one of the indicative metadata features of the subset of indicative metadata features includes a user-specific identifier, the method further includes: abstracting the user-specific identifier into a non-user specific identifier by generalizing one or more portions of the user-specific identifier, and wherein the text-based cybersecurity event digest includes the non-user specific identifier.

In one embodiment, the method further includes enriching the target cybersecurity event to include one or more additional pieces of event metadata based on one of the plurality of distinct pieces of event metadata, wherein: the text-based cybersecurity event digest includes at least one of the one or more additional pieces of event metadata; and the at least one of the one or more additional pieces of event metadata is distinct from the plurality of distinct pieces of event metadata.

In one embodiment, the method further includes displaying, via a web-accessible user interface, a representation of the target cybersecurity event that includes: the plurality of distinct pieces of event metadata of the target cybersecurity event; and a homogenous event user interface element integrally displayed within the representation of the target cybersecurity event.

In one embodiment, the method includes wherein the homogenous event user interface element includes a textual summary comprising both of (1) a numerical quantity of a total number of the one or more historical cybersecurity events or historical cybersecurity alerts returned from the search and (2) the threat handling action corresponding to each of the one or more historical cybersecurity events or historical cybersecurity alerts; a selectable hyperlink for each of the one or more historical cybersecurity events or historical cybersecurity alerts that, when selected, displays corresponding event or alert data for evaluation against the target cybersecurity event; and a selectable user interface object that, when selected, executes the one or more cybersecurity threat mitigation actions corresponding to the one or more cybersecurity event-specific handling actions.

In one embodiment, the method includes wherein the homogenous event user interface element comprises one or more emphasized regions that visually emphasizes the homogenous event user interface element from portions external to the homogenous event user interface element.

In one embodiment, the method further includes while displaying the representation of the target cybersecurity event: receiving an input selecting the selectable user interface object of the homogenous event user interface element; and in response to receiving the input, executing the one or more cybersecurity threat mitigation actions for the target cybersecurity event.

In one embodiment, the method includes wherein: selectively extracting the digest corpus comprising the subset of indicative metadata features is based on an event type or class of the target cybersecurity event.

In one embodiment, a method for automatically generating event-specific handling instructions for accelerating a threat mitigation of a cybersecurity event includes automatically generating, by one or more computers, a text-based cybersecurity event digest based on a target cybersecurity event that includes a plurality of distinct pieces of event metadata, wherein the generating the text-based cybersecurity event digest includes: selectively extracting a digest corpus comprising a subset of indicative metadata features from the plurality of distinct pieces of event metadata that characterize the target cybersecurity event; and automatically composing the subset of indicative metadata features into at least one string of text based on one or more cybersecurity metadata arrangement heuristics; computing, via a hashing algorithm, a cybersecurity hash signature of the target cybersecurity event based on the text-based cybersecurity event digest; searching, based on the cybersecurity hash signature of the target cybersecurity event, an n-dimensional space comprising a plurality of historical cybersecurity event hash signatures corresponding to a plurality of historical cybersecurity events; returning one or more historical cybersecurity events or historical cybersecurity alerts homogeneous to the target cybersecurity event based on the search; deriving, by the one or more computers, one or more cybersecurity event-specific handling actions for the target cybersecurity event based on identifying a threat handling action corresponding to each of the one or more historical cybersecurity events or historical cybersecurity alerts homogeneous to the target cybersecurity event; and executing, by the one or more computers, one or more cybersecurity threat mitigation actions corresponding to the one or more cybersecurity event-specific handling actions to resolve or mitigate the target cybersecurity event.

In one embodiment, the method includes wherein the target cybersecurity event is identified in real time or near real-time; and the executing of the one or more cybersecurity threat mitigation actions satisfies a target threshold event response time.

In one embodiment, the method includes wherein the target cybersecurity event is identified in real time or near real-time, and the executing of the one or more cybersecurity threat mitigation actions is in response to deriving the one or more cybersecurity event-specific handling actions.

In one embodiment, the method further includes automatically assigning, by the one or more computers, a hash signature decay rate to each of the plurality of historical cybersecurity event hash signatures of the n-dimensional space.

In one embodiment, the method includes wherein each of the one or more historical cybersecurity events or historical cybersecurity alerts returned from the search is within a target time span based on the hash signature decay rate.

In one embodiment, the method includes wherein executing the one or more cybersecurity threat mitigation actions includes automatically routing, by the one or more computers, the target cybersecurity event to a cybersecurity event disposal queue; automatically assigning, by the one or more computers, a disposal rationale to the target cybersecurity event based on the threat handling action corresponding to the each of the one or more historical cybersecurity events or historical cybersecurity alerts homogeneous to the target cybersecurity event; and bypassing a cybersecurity investigation that includes executing an automated cybersecurity investigation workflow for the target cybersecurity event.

In one embodiment, the method includes wherein executing the one or more cybersecurity threat mitigation actions includes routing the target cybersecurity event to a cybersecurity incident queue prior to executing an automated cybersecurity investigation workflow for the target cybersecurity event.

In one embodiment, the method includes wherein one of the indicative metadata features of the subset of indicative metadata features comprises a file path directory that includes a user-specific identifier and a file name comprising a file number; and the method further includes: abstracting the user-specific identifier of the file path directory into a non-user specific identifier by normalizing the user-specific identifier; and abstracting the file number of the file name into a non-numerical character by normalizing the file number of the file name.

In one embodiment, the method includes wherein the at least one string of text includes the non-user specific identifier associated with the user-specific identifier of the file path directory and the non-numerical character associated with the file number of the file name.

In one embodiment, the method includes wherein returning the one or more historical cybersecurity events or historical cybersecurity alerts homogeneous to the target cybersecurity event includes returning a first historical cybersecurity event, a second historical cybersecurity event, and a third cybersecurity event; the threat handling action corresponding to the first historical cybersecurity event, the second historical cybersecurity event, and the third historical cybersecurity event relates to a first threat handling action type of a plurality of distinct threat handling action types; and one of the one or more cybersecurity event-specific handling actions corresponds to the first threat handling action type associated with the first historical cybersecurity event, the second historical cybersecurity event, and the third historical cybersecurity event.

In one embodiment, the method includes wherein the subset of indicative metadata features includes a first indicative metadata feature of a first metadata type, a second indicative metadata feature of a second metadata type, and a third indicative metadata feature of third metadata type; and the at least one string of text includes the first indicative metadata feature of the first metadata type, the second indicative metadata feature of the second metadata type, and the third indicative metadata feature of third metadata type; and a position of the third indicative metadata feature within the at least one string of text is before the first indicative metadata feature and the second indicative metadata feature in accordance with one of the one or more cybersecurity metadata arrangement heuristics.

In one embodiment, a method for automatically generating alert-specific handling instructions for accelerating a threat mitigation of a cybersecurity alert includes identifying a target cybersecurity alert comprising a plurality of distinct pieces of alert metadata; automatically generating, by one or more computers, a text-based cybersecurity alert digest based on the target cybersecurity alert, wherein the generating the text-based cybersecurity alert digest includes: selectively extracting digest corpus comprising a subset of indicative metadata features from the plurality of distinct pieces of event metadata that characterize the target cybersecurity alert; and automatically composing the subset of indicative metadata features into at least one string of text based on one or more cybersecurity metadata arrangement heuristics; computing, via a cybersecurity hashing algorithm, a cybersecurity hash signature of the target cybersecurity alert based on the text-based cybersecurity alert digest; searching, based on the distinct cybersecurity hash signature of the target cybersecurity alert, an n-dimensional space comprising a plurality of historical cybersecurity alert hash signatures corresponding to a plurality of historical cybersecurity alerts; returning one or more historical cybersecurity events or historical cybersecurity alerts homogeneous to the target cybersecurity alert based on the search; deriving, by the one or more computers, one or more cybersecurity event-specific handling actions for the target cybersecurity event based on identifying a threat handling action corresponding to each of the one or more historical cybersecurity events or historical cybersecurity alerts homogeneous to the target cybersecurity alert; and executing, by the one or more computers, one or more cybersecurity threat mitigation actions corresponding to the one or more cybersecurity event-specific handling actions to resolve or mitigate the target cybersecurity alert.

BRIEF DESCRIPTION OF THE FIGURES

FIG. 2 illustrates an example method 200 in accordance with one or more embodiments of the present application;

FIG. 3 illustrates an example representation of one or more inbound alerts in accordance with one or more embodiments of the present application;

FIG. 4 illustrates an example representation of generating one or more abridged alert digests in accordance with one or more embodiments of the present application;

FIG. 5 illustrates an example representation of generating one or more alert representations in accordance with one or more embodiments of the present application;

FIG. 8 illustrates an example representation of an internet-accessible alert user interface including an alert similarity user interface element in accordance with one or more embodiments of the present application;

FIG. 10 illustrates an example representation of a graphical alert similarity user interface element in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
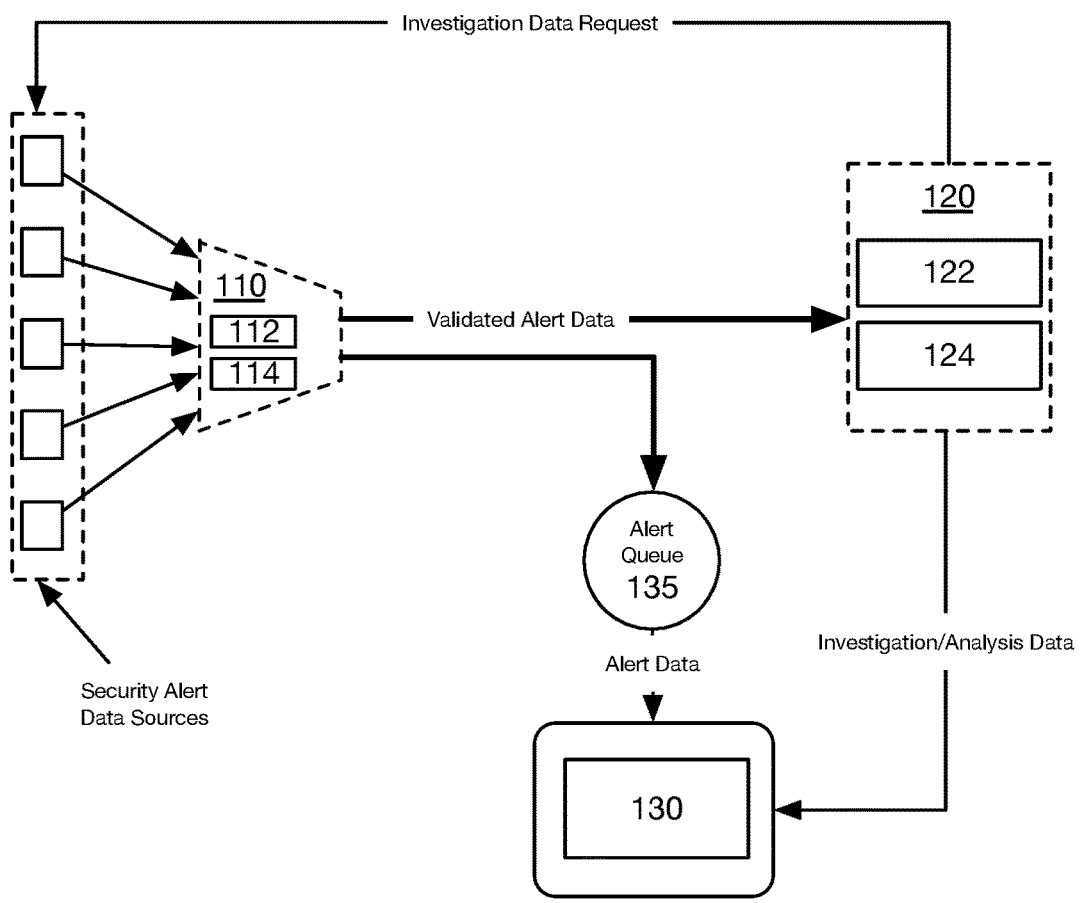
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100.

The system 100 may function to enable real-time cybersecurity threat detection, agile, and intelligent threat response for mitigating detected security threats.

1.1 Security Alert Engine

The security alert aggregation and identification module no, sometimes referred to herein as the "security alert engine no" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine no may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning System

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) and/or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

1.4 Alert Similarity Detection and Alert Handling Module

Figure 1A:
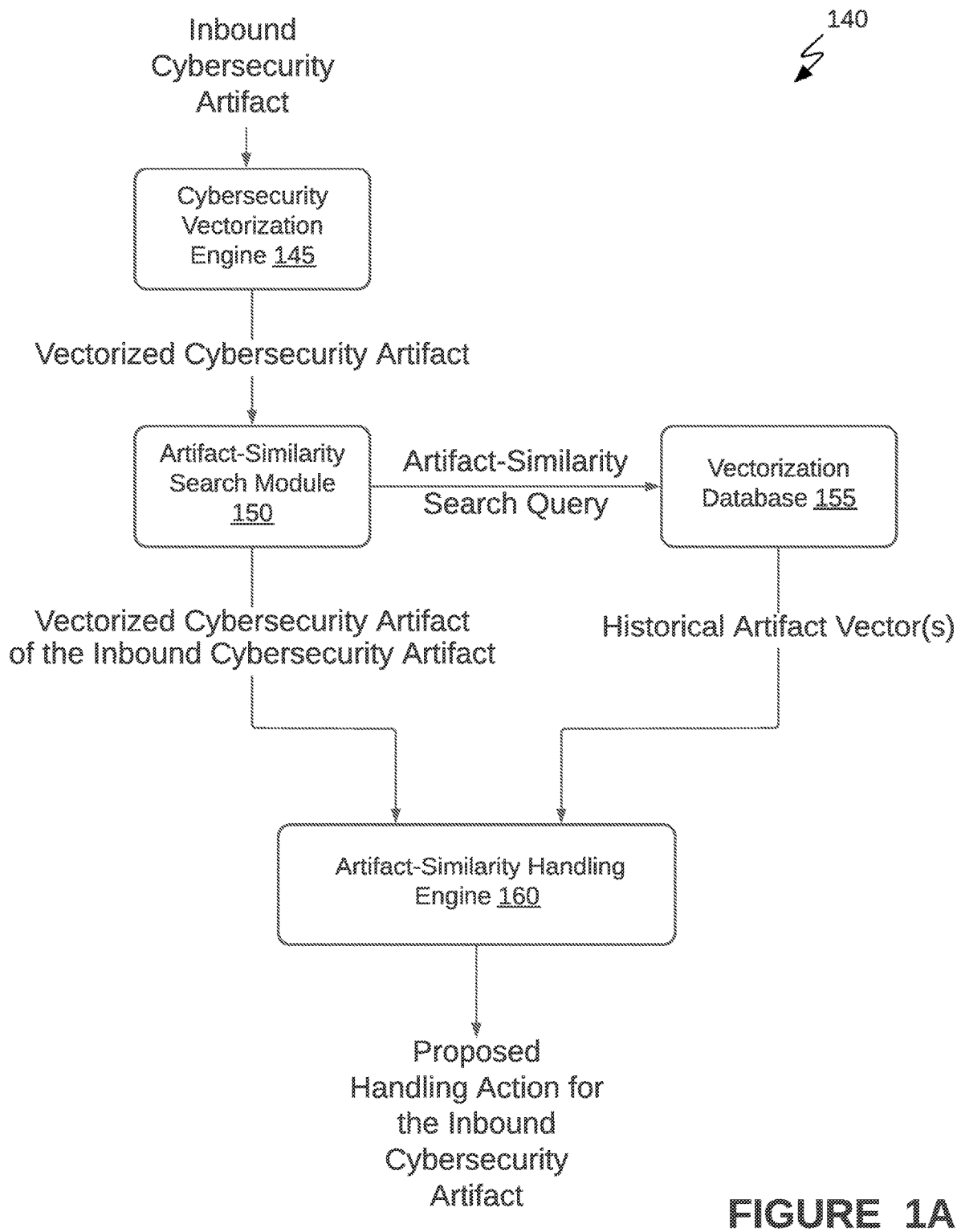
FIG. 1A illustrates a schematic representation of a subsystem of the system 100 in accordance with one or more embodiments of the present application.

As shown in FIG. 1A, a subsystem 140 (of the system 100) for intelligent alert similarity detection and handling of inbound alerts/events may include a cybersecurity vectorization engine 145, an artifact-similarity search module 150, a vectorization database or repository 155, and an artifact-similarity handling engine 160.

In one or more embodiments, the cybersecurity vectorization engine 145 may function to ingest inbound security artifact data including, but not limited to, cybersecurity alert data, event data, evidence data, and/or the like from a plurality of distinct sources of cybersecurity data. In one or more embodiments, based on identifying the inbound security artifact data for a distinct cybersecurity artifact, the cybersecurity vectorization engine 145 may function to compute or generate a distinct vector representation (or signature) that corresponds to the inbound cybersecurity artifact (e.g., an inbound cybersecurity event, an inbound cybersecurity alert, etc.).

In one or more embodiments, the artifact-similarity search module 150 may function to receive, as input, the distinct vector representation corresponding to the inbound cybersecurity artifact and construct an artifact-similarity search query that may include the distinct vector representation as a search parameter. In one or more embodiments, the artifact-similarity search query, when executed, may be used to search one or more vectorization databases (or alert spaces) 155 to identify one or more (probable) vector signatures or vector representations of the one or more vectorization databases (or alert spaces) 155 that may be homogenous, substantially similar or equivalent to the distinct vector representation corresponding to the inbound cybersecurity artifact, if any.

In one or more embodiments, the artifact-similarity handling engine 160 may function to receive the distinct vector representation corresponding to the inbound cybersecurity artifact and/or the one or more (probable) vector signatures or vector representations of the one or more vectorization databases (or alert spaces) 155 to generate one or more proposed handling actions (e.g., one or more mitigation or disposal actions) for the inbound cybersecurity artifact, as described in more detail herein.

2. Method for Intelligent Alert Similarity Detection and Alert Handling

As shown in FIG. 2, a method 200 for intelligent identification of similar alerts and alert handling of inbound alerts and/or events may include identifying inbound alert and/or event data S210, converting inbound alert or event data into vector representations S220, evaluating inbound alerts/events or alert/event representations against one or more n-dimensional spaces generated from processing alert or events S230, and generating one or more proposed mitigation actions (or one or more suggested actions) for one or more of the inbound alerts and/or events based on the evaluation S240. The method 200 may optionally include constructing one or more n-dimensional spaces S205.

In one or more embodiments, the method 200 may include an alert similarity detection technique that may identify historical alerts or historical events similar to a recently identified event or alert in real-time or near real-time. As described in U.S. Pat. No. 11,303,666, titled SYSTEMS AND METHODS FOR INTELLIGENT CYBER SECURITY THREAT DETECTION AND MITIGATION THROUGH AUTOMATED INVESTIGATIONS, each identified or generated alert produced by a security alert engine may lead to further investigation steps, including identifying an investigation workflow, executing the investigation workflow, and reporting on the findings of the investigation workflow, which is incorporated herein in its entirety by this reference. While such state-of-the-art investigation flow may provide effective alert-to-remediation or alert-to-triage, it may be possible to further accelerate alert-to-remediation or alert-to-triage by implementing an alert similarity detection stage or layer, as described herein below.

2.05 Constructing One or More N-Dimensional Spaces

Optionally, S205, which includes constructing one or more n-dimensional spaces, may function to construct one or more n-dimensional spaces based on converting one or more corpora of alert/event data into embeddings, vector representations, bit representation, or the like that may be mapped onto the one or more n-dimensional spaces. An n-dimensional space, as generally referred to herein, may be an n-dimensional space or an n-bit space that may be configured to include vector representations of distinct alert (or event) data and/or alert (or event) documents generated from alerts, events, and/or other pieces of evidence processed by the system 100 implementing the method 200.

In one or more embodiments, an n-dimensional space may include one or more vector representations generated based on distinct alert data, one or more vector representations generated based on distinct event data, and/or one or more vector representations generated based on both event data and alert data associated with the event data. Therefore, for ease of description in the remainder of this disclosure a vector representation mapped to an alert space (e.g., n-dimensional space) may generally be referred to and treated as an "alert vector," "an alert vector representation," "an alert hash signature," "a cybersecurity hash signature," or "an alert embedding" irrespective of if the alert vector representation was generated based on alert data, event data, or a combination of both alert and event data.

In one or more embodiments, S205 may function to construct an n-dimensional space (hereafter referred to as an "alert space") in a variety of modes based on a preferred deployment (or utilization) of a system 100 and/or the method 200. For instance, in one embodiment, S205 may function to construct a global alert space based on identifying corpora of alert/event data from a plurality of distinct subscribers. In such embodiments, a global alert space may be constructed that may include historical alert data or historical event data from a plurality of distinct subscribers in a single alert space (or repository). In other words, each of the alert vector representations stored in and/or mapped to the global alert space may be used as a primary evaluation source for recently identified inbound alerts or recently identified events from a plurality of subscribers (e.g., the global alert space may be subscriber agnostic when evaluating for historical alert vectors substantially similar to a target alert vector).

Alternatively, in one or more embodiments, S205 may function to individually construct one or more local or subscriber-specific alert spaces isolated to alert and/or event data of an individual subscriber (e.g., constructing an alert space per subscriber).

It shall be noted that, in one or more embodiments, corpora of alert/event data may include event data, alert data, log data that may be generated external to the system 100 and/or the method 200. It shall be further noted that the alert spaces described herein may be configured to store a plurality of distinct alert hashes (e.g., alert hash signatures, cybersecurity hash signatures) or a plurality of distinct alert embeddings associated with a plurality of distinct alerts and/or a plurality of distinct events.

Hash-Based Alert Space

In one or more embodiments, each of the one or more alert spaces may be configured or constructed to store and/or include representations of alerts and/or events (e.g., historical alerts or historical events or other historical cybersecurity evidence) in a variety of modes. For instance, in a first implementation, the one or more alert spaces may be a hash-based alert space configured to store a plurality of distinct hashes (or a plurality of distinct hash signatures (e.g., cybersecurity hashing-based signatures) for each piece of alert or event data included in the one or more corpora of alert/event data. That is, the hash-based alert space may be configured to store a distinct hash or a distinct hash signature that may represent each distinct piece of data of the one or more corpora of alert/event data based on any suitable type of hashing technique including, but not limited to, MinHash, a token-frequency hashing technique, and/or the like.

It shall be noted that, in operation, to generate a hash signature for each piece of alert data and/or event data of the one or more corpora of alert/event data, alert or event metadata associated with each distinct piece of alert or event data may be extracted and/or enriched from the distinct piece of alert or event data and arranged in an intelligent text sequence (e.g., an intelligent document sequence, an abridged alert digest, an abridged event digest or the like), as described in more detail herein. Accordingly, the intelligent text sequence (or the abridged alert digest or the abridged event digest) for each piece of alert or event data may be passed through a hashing algorithm (e.g., cybersecurity hashing algorithm) to generate a distinct hash signature, which may be mapped to the hash-based alert space.

Embeddings-Based Alert Space

In a second implementation, the one or more alert spaces may be an embeddings-based alert space configured to include a plurality of embeddings based on one or more corpora of alert/event data. In such implementation, the embeddings-based alert space may be configured to store a distinct embedding value or distinct embedding representation of each distinct piece of alert data and/or event data included in the one or more corpora of alert/event data based on any suitable type of embedding technique or service.

It shall be noted that, the embedding technique that may be used to generate embedding values for the embeddings-based alert space may take a variety of forms based on a preferred embedding technique of the system 100 and/or the method 200.

For instance, in a first implementation, generating an embedding value for each (distinct) piece of alert data and/or event data of the one or more corpora of alert/event data may include extracting, modifying, removing, enriching, and/or arranging alert metadata (or data) associated with a distinct alert or distinct event of the one or more corpora of alert/event data in an intelligent text sequence (e.g., an intelligent document sequence, an abridged alert digest, an abridged event digest or the like). In one or embodiments, the intelligent text sequence may be directly passed to an embedding service and/or an embedding model that may generate a distinct embedding value representative of the distinct alert or event, such that the distinct embedding value may then be mapped to the embedding-based alert space. It shall be noted that in some embodiments, the system 100 and/or the method 200 may directly generate an embedding value for each piece of alert data or event data of the one or more corpora of alert/event data from (raw) alert or event data.

In a second implementation, generating an embedding value for each piece of alert and/or event data of the one or more corpora of alert/event data, may include selectively extracting, enriching, and/or arranging alert metadata associated with a distinct alert or event of the one or more corpora of alert/event data in an intelligent text sequence (e.g., an intelligent document sequence, an abridged alert digest, an abridged event digest or the like). In such implementation, the intelligent text sequence may be directly passed to a hashing algorithm to generate a hash signature, and the outputted hash signature from the hashing algorithm may be passed to an embedding service and/or an embedding model that may generate a distinct embedding representative of the distinct alert or event based on the passed hash signature, such that the generated embedding value may then be mapped to the embedding-based alert space.

Alert/Event Database

In a third implementation, the one or more alert spaces may be an alert database in which each distinct intelligent text sequence (e.g., each abridged alert digest, each abridged event digest, etc.) for each piece of alert data or event data of one or more corpora of alert data may be associated with an alert hash signature and/or an alert embedding value that may be digitally stored in the alert database and electronically accessible to a system (e.g., the system 100 implementing the method 200). That is, in some embodiments, each (distinct) piece of alert or event data of the one or more corpora of alert/event data may be associated with both a corresponding hash signature and a corresponding embedding value. In such embodiments, any suitable search technique, such as regular expression with or without Boolean logic, k-nearest neighbors (kNN), approximate nearest neighbors (ANN) may be implemented for performing alert similarity detection.

Alert Decay Rate|Rate of Decay

Additionally, or optionally, each hash signature (e.g., cybersecurity hashing-based signature) or each embedding value included in the one or more alert spaces of the first implementation, the second implementation, and/or the third implementation may be associated with a decay rate. In other words, each piece of alert and/or event data of the one or more corpora of alert/event data mapped to (or stored in) a target alert space may further have a corresponding decay rate value assigned thereto.

In one or more embodiments, each distinct hash signature generated for each piece of alert and/or event data may be associated with a decay value that may change or reduce over time according to a decay rate. Accordingly, in such embodiments, the decay rate may reduce the evidentiary value of a given hash signature within an alert space as time passes. For instance, a first (cybersecurity) hash signature (in an alert space) may have a decay value greater (e.g., decaying faster) than a second (cybersecurity) hash signature (in the same alert space), as the first hash signature may have appeared in the alert space earlier in time than the second hash signature.

It shall be noted that, in one or more embodiments, the decay rate may influence detecting similar alerts and/or events. For example, within a first time period, the system 100 and/or the method 200 may identify, for a target embedding value or a target hash signature corresponding to an inbound alert or event, one or more embedding values or one or more hash signatures in an alert space that may be similar to the target embedding value or target hash signature of the inbound alert or event, however, outside of the first time period, the one or more embedding values or the one or more hash signatures may not be identified as similar due to the decay rate.

2.10 Identifying Alerts and/or Events

S210, which includes identifying alerts and/or events, may function to identify inbound alerts and/or events collected from one or more data sources. In one or more preferred embodiments, the system 100 and/or the method 200 may identify inbound alerts and/or events by collecting and/or receiving alert and/or event data from one or more data sources in real-time or near real-time to initiate fast-processing of the inbounds alerts and/or events (e.g., recently identified cybersecurity alerts, recently identified cybersecurity events, etc.). It shall be further noted that for identifying inbound alerts or events, reference is made to U.S. patent application Ser. No. 17/671,881, filed on 15 Feb. 2022 titled SYSTEMS AND METHODS FOR INTELLIGENT CYBER SECURITY THREAT DETECTION AND INTELLIGENT VERIFICATION MESSAGES THROUGH AUTOMATED WORKFLOWS, which is incorporated herein in its entirety by this reference.

In operation, S210 may function to instantaneously initiate (or instantiate) an alert similarity detection technique that may function to identify historical alerts and/or events similar or homogenous to each (recently) identified inbound alert and/or event by the system 100 and/or the method 200, or at least for a target inbound alert and/or event. It shall be noted that identifying inbound alerts and/or events may include identifying generated alerts and/or events external to the system (e.g., raw data signals from enrichment sources, vendor alerts, third party alerts, etc.) and/or internal to the system (e.g., system-validated security alerts, or the like).

In a first implementation, S210 may function to identify inbound alerts and/or events by collecting and/or receiving data signals from one or more distinct data sources. In one or more embodiments of the first implementation, the data signals may relate to third-party alerts, event data, event logs, security policy alerts and/or activity data occurring with or involving internal computing networks or resources from a subscriber (e.g., one or more computing resources of the subscriber, one or more computer network resources of the subscriber, one or more data resources of the subscriber, one or more cloud-based resources of the subscriber, any computer accessible digital entity or device of the subscriber, and/or the like). In one or more embodiments, the data signals may be unprocessed to the system 100 and generated by one or more distinct data sources external to the system 100 and/or the method 200.

In one or more embodiments, S210 may function to periodically request or generate application programming interface (API) calls to each of the one or more distinct data sources for providing data signals to the system (e.g., the system 100 implementing the method 200). Additionally, or alternatively, S210 may function to receive automatic pushes of data signals from the one or more distinct data sources to the system (e.g., the system 100) and/or the method 200. It shall be noted that internal user activity and/or external third-party activity occurring within a subscriber environment that deviates from an implemented subscriber security policy may cause a security data signal to be generated, and, thus, identifiable or detectable by the system or service 100 implementing the method 200.

Additionally, or alternatively, in a second implementation, S210 may function to identify inbound alerts by automatically passing the identified data signals through an automated security alert engine that may generate system-validated security alerts. In such implementation, S210 may function to implement an automated security alert engine that may automatically ingest the data signals, process the data signals, and generate and/or publish one or more system-validated alerts based on the processing of the data signals.

A system-validated alert, as generally be referred to herein, may relate to one or more identified data signals that may be processed through an automated security alert engine (e.g., the security alert engine no) and published/identified by the system (e.g., the system 100 and/or the method 200) as valid (e.g., not a false-positive, initially appears to be a security threat, initially appears to look malicious, etc.).

Figure 7:
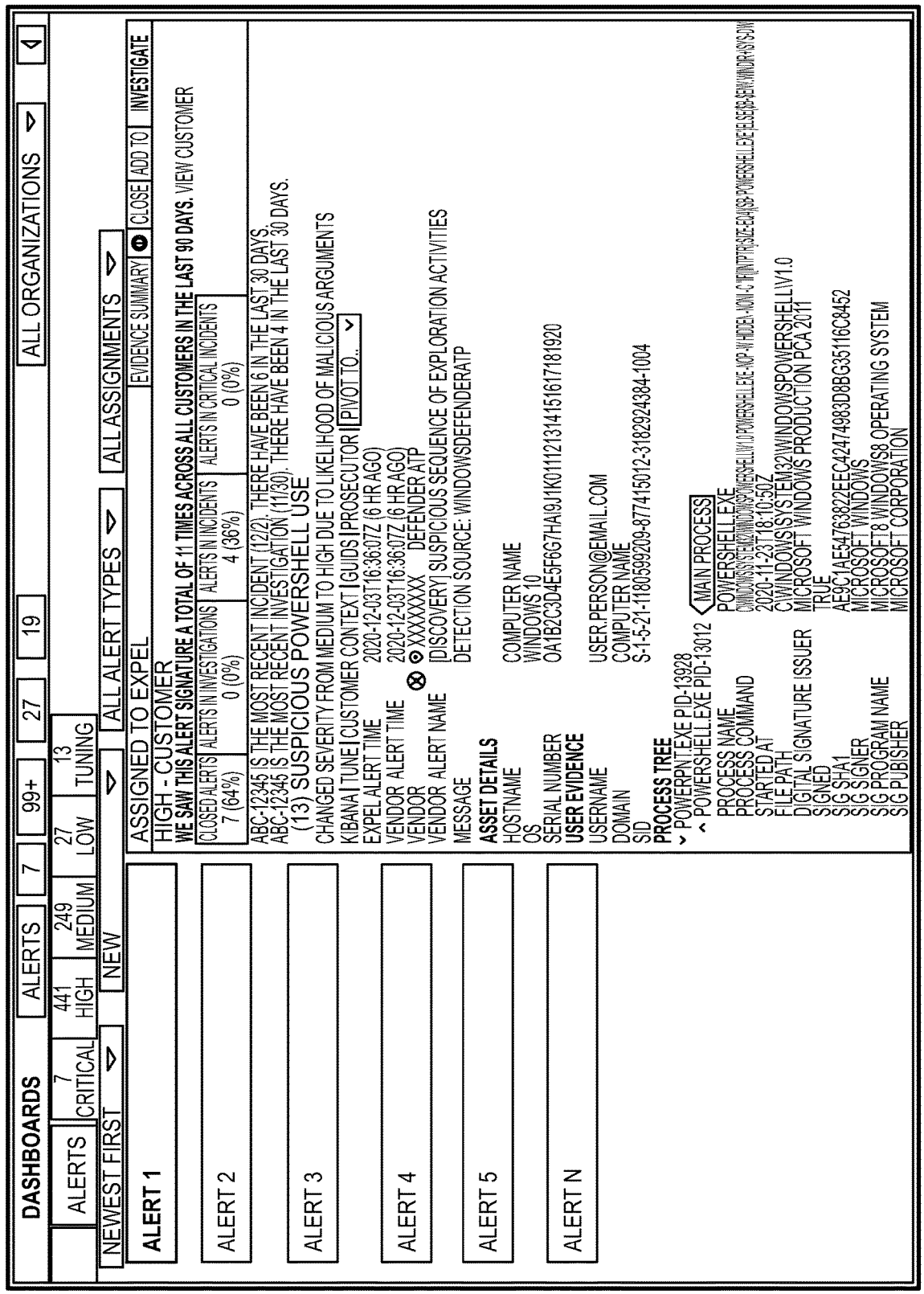
FIG. 7 illustrates an example representation of an internet-accessible alert user interface in accordance with one or more embodiments of the present application

Accordingly, in one or more embodiments of the first implementation or the second implementation, based on identifying inbound alerts and/or events, S210 may function to collect the inbounds alerts (e.g., recently generated alerts and/or events) and store the identified inbound alerts and/or events in a security alert queue for review and/or evaluation by a security analyst or the like. It shall be noted that a representation of the security alert queue may be displayed on a web-based alert user interface, as shown generally by way of example in FIG. 7 and FIG. 8.

2.20 Converting Alerts and/or Events into Vector Representations

S220, which includes converting inbound alerts and/or events into vector representations, may function to convert one or more of the identified (inbound) alerts and/or one or more of the identified events into one or more distinct vector representations, respectively. A vector representation, as generally referred to herein, may be a conversion of an inbound alert and/or inbound event (e.g., a recently identified alert and/or event) from an original dimensional state into a dimensional state lower than the original dimensional state.

It shall be noted that for ease of description in the remainder of S220, disclosure is generally directed to converting inbound alerts into abridged alert digests and converting the abridged alert digests into alert representations (e.g., alert vector representations, cybersecurity hashing-based signatures or the like), however, an analogous technique and description similarly applies for events and alert/event combinations (e.g., event data+alert data that may be associated with the event data).

In one or more preferred embodiments, S220 may function to translate or convert inbound alerts into alert representations through one or more transformations, including, but not limited to, intelligently deriving an alert digest corpus comprising indicative metadata features of a target inbound alert, composing the indicative metadata features into at least one string of text, and/or converting the at least one string of text into a distinct alert hash value (or signature) and/or a distinct alert embedding value, as shown generally by way of example in FIG. 3, FIG. 4, and FIG. 5.

Converting Inbound Alert Data into Abridged Alert Digests

In one or more embodiments, before converting inbound alerts into alert representations (e.g., hash signatures, hash values, embedding values, etc.), S220 may apply one or more alert pre-processing technique to each identified inbound alert or at least for a target inbound alert. In such embodiments, the alert pre-processing technique may include generating an abridged alert digest that may intelligently and/or succinctly characterize each target inbound alert. That is, in some embodiments, S220 may function to automatically generate an abridged alert digest that may be a condensed representation of a collection of metadata/data associated with one or more events and/or occurrences associated with the target inbound alert.

For instance, in one or more preferred embodiments, S220 may function to derive for each distinct inbound alert, an intelligent token sequence (e.g., intelligent text string) that may intelligently and/or succinctly describe or characterize a target inbound alert. Stated differently, in one or more embodiments, S220 may function to automatically, by one or more computers, selectively extract a digest corpus that may include a subset of indicative data and/or metadata features from a plurality of distinct pieces of alert metadata of a target cybersecurity alert. It shall be noted that a target inbound alert may include a plurality of identifying elements or metadata, such as a source internet protocol address (e.g., 67.162.111.13 or the like), a country code (e.g., US or the like) associated with the source internet protocol address, a source user (e.g., user1@company.com) associated with the alert, a source user email (e.g., user1@company.com) associated with the alert, a destination user of the alert (e.g., android_emm_uem@company.com or the like), a destination user email of the alert (e.g., android_emm_uem@company.com or the like), an internet service provider (e.g., ISP or the like), an antonymous system number (ASN) of the Internet provider (e.g., 7744 or the like), the country of origin of the internet provider (e.g., US or the like), and/or a type of alert, as shown generally by way of example in FIG. 3. It shall be further noted that, in one or more embodiments, the target inbound alert may include one or more pieces of non-probative metadata (or data) that may not be included in the digest corpus.

Accordingly, in one or more embodiments, S220 may function to generate an intelligent token sequence (or intelligent document sequence) of the inbound alert based on the one or more identifying elements or (e.g., probative) metadata associated with the target inbound alert. That is, S210 may generate an abridged alert digest in the form of an intelligent token sequence or intelligent document sequence based on intelligently extracting and/or prioritizing one or more alert metadata elements associated with the target inbound alert. In other words, S210 may generate an abridged alert digest for a target inbound alert by converting (or translating) the target inbound alert that may include a plurality of metadata elements into a single text string (e.g., an abridged alert digest) comprising a subset of the plurality of metadata elements.

In operation, the intelligent token sequence (or the intelligent document sequence) may be automatically generated based on a type or class of alert and/or automatically generated based on predefined conditions and/or sequence (or ordering) conditions by an alert similarity detection engine, as shown generally by way of example in FIG. 4. That is, in one or more embodiments, S220 may function to create an abridged alert digest for a target alert automatically by an alert similarity detection engine and/or by predefined conditions and/or order sequencing heuristics of an alert/event similarity detection engine. For instance, in a non-limiting example, S220 may function to generate an alert digest for a target inbound alert of a first type in a first metadata sequence. Additionally, or alternatively, S220 may function to generate an alert digest for a target inbound alert of a second type in a second metadata sequence distinct from the first metadata sequence.

It shall be noted that sequencing and/or ordering conditions (e.g., cybersecurity metadata arrangement heuristics), as generally referred to therein, may be heuristics that governs a positioning or location of metadata (or data) relative to other metadata (or data) in an alert digest (e.g., text-based cybersecurity digest or the like). For instance, in a non-limiting example, one of the cybersecurity metadata arrangement heuristics may require that metadata associated with a first metadata tag (e.g., an ASN number) may be positioned in front of metadata associated with a second metadata tag (e.g., a country of origination), which may be positioned in front of metadata associated with a third metadata tag (e.g., an internet service provider), which may be positioned in front of metadata associated with a fourth metadata tag (e.g., a user), which may be positioned in front of metadata associated with a fifth metadata tag (e.g., the company a user may be associated with).

(i) Abstracting Alert Metadata Features

Additionally, or optionally, in some embodiments, to prevent a downstream operation from generating overly specific alert representations (e.g., vector representations, cybersecurity hash signatures, etc.), S220 may function to generalize or abstract non-informative and/or overly-informative alert metadata features. For instance, in a non-limiting example, an inbound alert may include a unique email metadata feature such as "john.doe@company123.com" and, in some embodiments, S220 may function to abstract or generalize the unique email metadata feature in the abridged alert digest as "<user>@<company>.com". In the same or another non-limiting example, an inbound alert may include time stamp metadata and file path metadata such as "2021-12-13T00:45:31+00:00/users/john/documents/projects" and, in some embodiments, S220 may function to not include the time stamp metadata feature and/or generalize or abstract the file path metadata (in the abridged alert digest) as "/users/<user>/documents/projects." It shall be noted that abstracting or generalizing non-informative alert metadata features may prevent misidentifying similar (or homogenous) alert representations of the one or more alert spaces contributed to overly specific alert metadata features included in the abridged alert digest (e.g., text-based cybersecurity event digest).

(ii) Abridged Alert Digest Enrichment

Additionally, or optionally, in one or more embodiments, S220 may function to include one or more pieces of evidence that may not have been originally included as alert metadata in a target inbound security alert. For instance, in a non-limiting example, an inbound alert may include metadata corresponding to an internet protocol address, but may not include geo-location data (e.g., time zone data, geographical location data, etc.) and, in such non-limiting example, S220 may function to derive one or more pieces of geo-location data based on the internet protocol address and construct an abridged alert digest (e.g., text-based cybersecurity digest) that includes, at least, the one or more pieces of geo-location data and/or the internet protocol address.

Converting Abridged Alert Digests-to-Alert Representations

In one or more embodiments, based on or in response to generating an abridged alert digest for a target inbound alert, S220 may function to convert or transform the abridged alert digest of the target inbound alert into an alert vector representation (e.g., fixed length alert representation, an alert hash value, an alert embedding value, or the like), as shown generally by way of example in FIG. 5.

In a first implementation, an alert hash value or an alert hash signature may be generated for an abridged alert digest associated with a target inbound alert based on using a MinHash hashing algorithm. In such implementation, the MinHash hashing algorithm may function to approximate a target abridged alert digest associated with an inbound alert as a vector of integers or bits of a fixed length vector size (e.g., 128/256, etc.). In one or more embodiments of the first implementation, via a cybersecurity event hashing algorithm, S220 may function to compute one or more hash value for each token of the (abridged) alert digest. For instance, in a non-limiting example, an abridged alert digest of an inbound alert, such as, "7744 US android_emm_uem company.com comcast cable communications inc isp users company.com us" may be passed through a MinHash hashing algorithm to generate an alert hash signature (with bit width), such as, [0, 1, 1, 0, 1, . . . , 1, 1]. It shall be noted that a distinct hash value or a distinct hash signature may be generated for each abridged alert digest of each inbound alert by passing each abridged alert digest through a MinHash hashing algorithm (e.g., cybersecurity hashing algorithm).

In a second implementation, an alert hash value or alert hash signature may be generated based on using a token-frequency hashing algorithm. In such implementation, the token-frequency hashing algorithm may function to approximate a target abridged alert digest associated with an inbound alert as a vector of bits or integers of a fixed length vector size (e.g., 128/256) based on token frequency. For instance, an abridged alert digest of an inbound alert, such as, "7744 US android_emm_uem company.com comcast cable communications inc isp users company.com us" may be passed through a token-frequency hashing algorithm to generate an alert hash signature, such as, [0, 0, 1, 0, 1, . . . , 1, 1]. It shall be noted that a distinct hash value or distinct hash signature may be generated for each abridged alert digest of each inbound alert by passing each abridged alert digest through the token-frequency hashing algorithm.

In a third implementation, an embedding value may be generated based on using an embedding service or embedding model to generate an embedded representation of an abridged alert digest of a target inbound alert. For instance, in one or more embodiments, an embedding service or embedding module may function to approximate an abridged alert digest associated with a target inbound alert by passing the abridged alert digest of the target inbound alert to an embeddings service or embeddings model to generate an embedding value based on the abridged alert digest of the inbound alert.

It shall be noted that, in operation, the system 100 and/or the method 200 may function to intelligently select or implement any type of embedding service and/or any type of hashing algorithm that may optimally and accurately interpret the abridged alert digest associated with a distinct inbound alert. For instance, based on an alert representation type of a constructed alert space, the system 100 and/or the method 200 may default to interpreting each generated abridged alert digest associated with each inbound alert to the same (or an equivalent) alert representation type of the constructed alert space. In other words, if the constructed alert space stores hash signatures of alerts based on or using a MinHash algorithm, the MinHash algorithm or an equivalent hashing algorithm may be used when converting abridged alert digests to alert representations.

Accordingly, in one or more embodiments, S220 may use the same or a substantially similar embedding service or hashing algorithm for both constructing an alert space and generating alert representations of abridged alert digests of inbound alerts (e.g., recently identified alerts).

2.30 Evaluating Inbound Alerts and/or Inbound Events Against One or More
Alert Spaces S230, which includes evaluating the inbound alerts and/or the inbound events against the one or more alert spaces or repositories, may function to evaluate a hash signature or embedded representation of each target alert or event against one or more alert spaces to identify homogenous or substantially similar hash signatures or embedded representations located in the one or more alert spaces. In a preferred embodiment, to identify hash signatures or embedded representations that may be similar to hash signatures or embedded representations in the one or more alert spaces, S230 may function to compute one or more similarity metrics (e.g., computing an alert similarity score, computing a similarity distance, etc.) and/or may require one or more similarity criterion to be satisfied.

It shall be noted that for ease of description in the remainder of S230, disclosure is generally directed evaluating hash signatures or embedding values of inbound alerts against an alert space, however, an analogous technique and description similarly applies for events (e.g., evaluating hash signatures or embedding values of inbound events against an alert space) and alert/event combinations (e.g., event data+ alert data that may be associated with the event data).

In operation, S230 may function to construct an alert similarity search query that may include a target alert representation (e.g., cybersecurity hashing-based signature, etc.) as a search parameter that, when executed may function to search the one or more alert spaces. In one or more embodiments, evaluating hash signatures or embedding values of inbound alerts against an alert space, may include accessing an alert space (e.g., accessing one or more of the alert spaces constructed in S205) that may have used the same or an equivalent hashing or embedding technique used to interpret historical alerts into alert representations (e.g., embedding values or hash signatures) to that of the technique used to convert inbound alert data into alert representations, as described above. Stated differently, hash signatures of inbounds alerts and hash signatures of alerts spaces may preferably use the same or an equivalent type of hashing service and/or hashing technique to generate hash values and/or hash signatures. This may provide S230 the capability of accurately identifying (historical) alerts in the alert space that may be similar (or homogeneous) to a target inbound alert while avoiding false positives.

In one or more embodiments, based on or in response to executing the alert similarity search query, S230 may function to (e.g., only) evaluate or assess the cybersecurity-hashing based signatures of the alert space that are substantially similar or equivalent to a size or length of a target cybersecurity hashing-based signature of a target alert. Stated differently, in one or more embodiments, S230 may (e.g., only) assess or evaluate the hashing-based signature of the target cybersecurity event against each of a subset of the plurality of historical cybersecurity event hashing-based signatures having a same or similar number of tokens or similar token size.

In a first implementation, S230 may function to compute an alert similarity score between a hash signature of a target inbound alert and at least one of a plurality of hash signatures of an alert space to identify similar (or homogenous) alerts. In one or more embodiments of such implementation, S230 may function to compute an alert similarity score between a hash signature of a target inbound alert and each hash signature of the plurality of hash signatures of the alert space (or a selective subset) and if a computed alert similarity score exceeds a similarity score threshold, a similar hash signature may be identified, and thus a similar alert. It shall be noted that the similarity score may be set at a level high enough to return near or substantially exact (hash signature) matches.

Additionally, in some embodiments of the first implementation, computing an alert similarity score for an alert pairwise (e.g., between a hash signature of a target inbound alert and a hash signature of an alert space) may be a function of or based on a computed distance therebetween. For instance, a hamming distance may be used for comparing MinHash hashes. Accordingly, a higher alert similarity score may be generated for an alert pair if the computed distance may be below a distance threshold and a lower alert score may be generated for an alert pair if the computed distance exceeds a distance threshold.

It shall also be noted that as a decay rate factor may be assigned to one or more hash signatures in the alert space this may additionally affect the computed similarity score and/or distance for an alert pairwise. For instance, in a non-limiting example, S230 may identify two or more hash items within a hash alert space having a comparable or same distance to a subject inbound alert. In such example, the distinct decay rate for each of the two or more items may function to reduce its evidentiary value or alert value as time progresses and therefore, influence a selection of one of the two or more hash items having the highest or best alert value (e.g., least amount of decay).

Additionally, or alternatively, in a second implementation, S230 may function to identify similar alerts for a target inbound alert based on computing a mathematical distance between an embedded representation of a target inbound alert and at least one of a plurality of embedded representations of an alert space. In such implementation, a short distance threshold (e.g., a maximum distance value) may be set to identify similar alerts between an embedded representation of a target inbound alert and an embedded representation of a historical alert of the alert space, which may signify a high degree of similarity (or homogenous) upon satisfying the short distance threshold. Additionally, or alternatively, S230 may function to identify similar alerts for a target inbound alert based on identifying if the target inbound alert may be spatially near a centroid or the like of an alert cluster of an alert space.

It shall be noted that, similar (or homogenous) identified alerts to a target inbound alert in the first implementation and/or the second implementation may be an alert that may have occurred in the past and may share one or more similar metadata characteristics with the target inbound alert. It shall be noted that upon identifying similar alerts some (non-critical or non-probative) alert characteristics or alert metadata of the similar alerts may be different than one or more alert characteristics or alert metadata of the target inbound alert.

2.40 Generating One or More Proposed Actions for a Target Inbound Alert or Target Inbound Event S240, which includes generating one or more proposed actions for a target inbound alert or target inbound event, may function to generate or propose one or more cybersecurity handling actions, one or more management actions, and/or one or more disposals actions for a target inbound alert or target inbound event based on identifying a cybersecurity handling action or cybersecurity management action associated with each (or at least one of an) identified similar alert and/or event. In one or more embodiments, via one or more computers, S240 may function to generate (or derive) one or more proposed (or recommended) handling or management actions for a target inbound alert or a target inbound event by borrowing the handling/management actions performed in handling the historical, similar alert and/or event. It shall be noted that for ease of description in the remainder of S240, disclosure is generally directed to generating a proposed alert action for a target inbound alert, however, an analogous technique and description similarly applies for events (e.g., generating a proposed event action for a target inbound event).

In one or more embodiments, a proposed alert action, as generally referred to herein, may include one or more of a proposed triaging action (e.g., proposed triaging recommendation), one or more proposed threat mitigation actions (e.g., proposed threat mitigation recommendations), and one or more proposed remediation actions (e.g., proposed remediation recommendations).

In one or more preferred embodiments, based on identifying an alert similar or related to a target inbound alert as described in S230, S240 may function to identify a manner in which the similar alert was handled and/or managed by one or more portions of the system 100.

For instance, in one or more embodiments, identifying a manner in which the one or more similar alerts may have been managed and/or handled by one or more portions of the system 100 may include obtaining (or surfacing or acquiring) information (e.g., data) on one or more of: how the one or more identified similar (or homogenous) alerts were triaged, what type of investigation workflows were triggered for the one or more similar alerts, was the one or more similar alerts eventually identified as a false-positive, was the one or more similar alerts ever escalated to an incident level, was the one or more similar alert ever de-escalated from an incident level, or the like. It shall be noted that S240 may function to identify and/or obtain and/or surface any type of system handling or system management information that may inform or support a proposed (handling) action for a target inbound alert.

Figure 6:
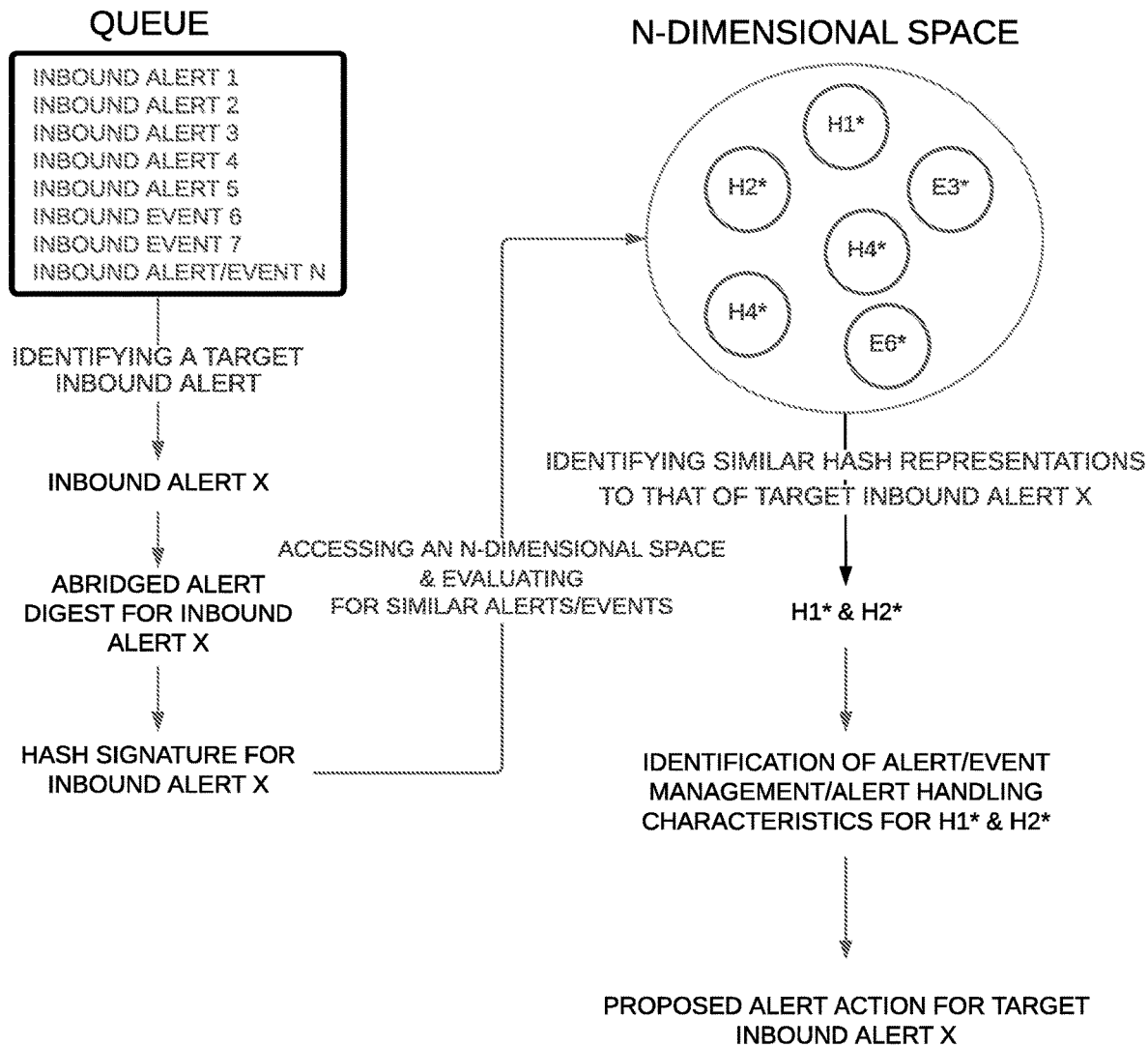
FIG. 6 illustrates an example schematic for implementing portions of the method 200 and a system in accordance with one or more embodiments of the present application.
Figure 9:
FIG. 9 illustrates an example representation of a graphical alert similarity user interface element in accordance with one or more embodiments of the present application.

Accordingly, in one or more embodiments, S240 may function to derive or identify, by one or computers, the proposed alert action based on how one or more of the similar alerts were handled and/or managed by one or more portions of the system 100 (e.g., if one or more similar alerts were promoted to an incident level—the proposed alert action may be to promote the target inbound alert to an incident level, if one or more similar alerts were disposed or deescalated (e.g., during an investigation, etc.)—the proposed alert action may be to dispose of/remove the target inbound alert in the alert queue, if one or more similar alerts caused proposal of a remediation (or resiliency) action—the proposed alert action may be to propose the same remediation (or resiliency action), and if one or more similar alerts were previously closed as "benign" the proposed alert action may be to dispose (or close) the target inbound alert in the alert queue as "benign", etc.) as shown generally by way of example in FIG. 6 and FIG. 9.

Additionally, or alternatively, in one or more embodiments, S240 may function to detect, by one or more computers, that a hash signature of a recently-identified target alert (e.g., inbound alert) may be similar to one or more hash signatures of one or more alerts in an active, critical cybersecurity incident. In such embodiments, S240 may function to generate a proposed alert action that may relate to adding or routing the recently identified target alert to the active, critical cybersecurity incident to expedite a threat evaluation and/or mitigation of the recently-identified target alert, as shown generally by way of example in FIG. 10.

Additionally, or alternatively, S240 may function to identify a proposed alert action for a target inbound alert based on identifying if the target inbound alert may be spatially near an alert cluster in the alert space (e.g., within a threshold distance). The alert cluster may be associated with a plurality of alerts that may be associated with a specific alert suppression type, and thus, the proposed alert action for the target inbound alert may be to propose the specific suppression type of the nearest alert cluster if within a threshold distance.

Additionally, or optionally, before generating a proposed alert action, S240 may require a similar alerts quantity threshold to be satisfied that may require identifying (or detecting) a predetermined number of similar alerts before an alert action may be generated or proposed for a target inbound alert. That is, S240 may function to only generate or propose an alert action based on identifying n-number of similar alerts (e.g., two or more similar alerts, three or more similar alert, eight or more similar alert, n-number of similar alerts, etc.) related to a target inbound alert (e.g., more similar alerts to target alert may equate to an increase in the confidence and/or probability of a proposed alert action). It shall be noted that the similar alerts threshold may be tunable based upon different subscriber environments and/or subscriber security policies. In one or more embodiments, an alert similarity user interface element (described in more detail below) may be displayed on a cybersecurity dashboard based on satisfying the similar alerts threshold in analogous ways.

Accordingly, it shall be noted that in such embodiments in which a similar alerts quantity threshold may not be satisfied, S240 may still function to provide (or pass) the similar alert(s) that may have been identified in S230 to a downstream operation that may aid in supplementing or supporting an investigation for the target inbound alert.

Applications of Proposed Alert Actions

In a first implementation, S240 may function to automatically recommend or propose an alert action to a portion of the system 100 and/or the method 200 to act on a target inbound alert without review by a subscriber and/or a security analyst. Accordingly, in embodiments in which S240 may automatically generate and implement an alert-based recommendation for a target inbound alert, S240 may further function to remove or dispose of the target inbound alert from an alert queue. Thereby, enabling the system 100 (implementing the method 200) the capability of focusing on new (or emerging) alerts, while simultaneously reducing the time an inbound alert is in the alert queue.

In a second implementation, S240 may function to automatically propose and surface, via a user interface, an alert action for a target inbound alert. In one or more embodiments of the second implementation, S240 may require that a security analyst reviews the proposed alert action generated and surfaced by the system 100 and/or the method 200 to verify that the proposed alert action may be appropriate and/or accurate. In such implementations in which the proposed alert action may be surfaced to a security analyst, the security analyst may accept (e.g., execute) or decline (e.g., not execute) the proposed alert action for a target inbound alert, which may be used as feedback for future learning and training of the system 100 and/or the method 200 when adjustments or tuning may be needed.

Surfacing Proposed Alert Actions to Analysts

In one or more embodiments, S240 may function to generate an alert similarity user interface element, via a cybersecurity dashboard, that may surface or emphasize that the target cybersecurity alert may be substantially similar to one or more historical cybersecurity alerts and/or events previously assessed by the cybersecurity threat detection and threat mitigation system 100 and/or indicate a (proposed) alert handling action based on the substantially-similar (or homogenous) historical cybersecurity alerts and/or events.

Figure 8:
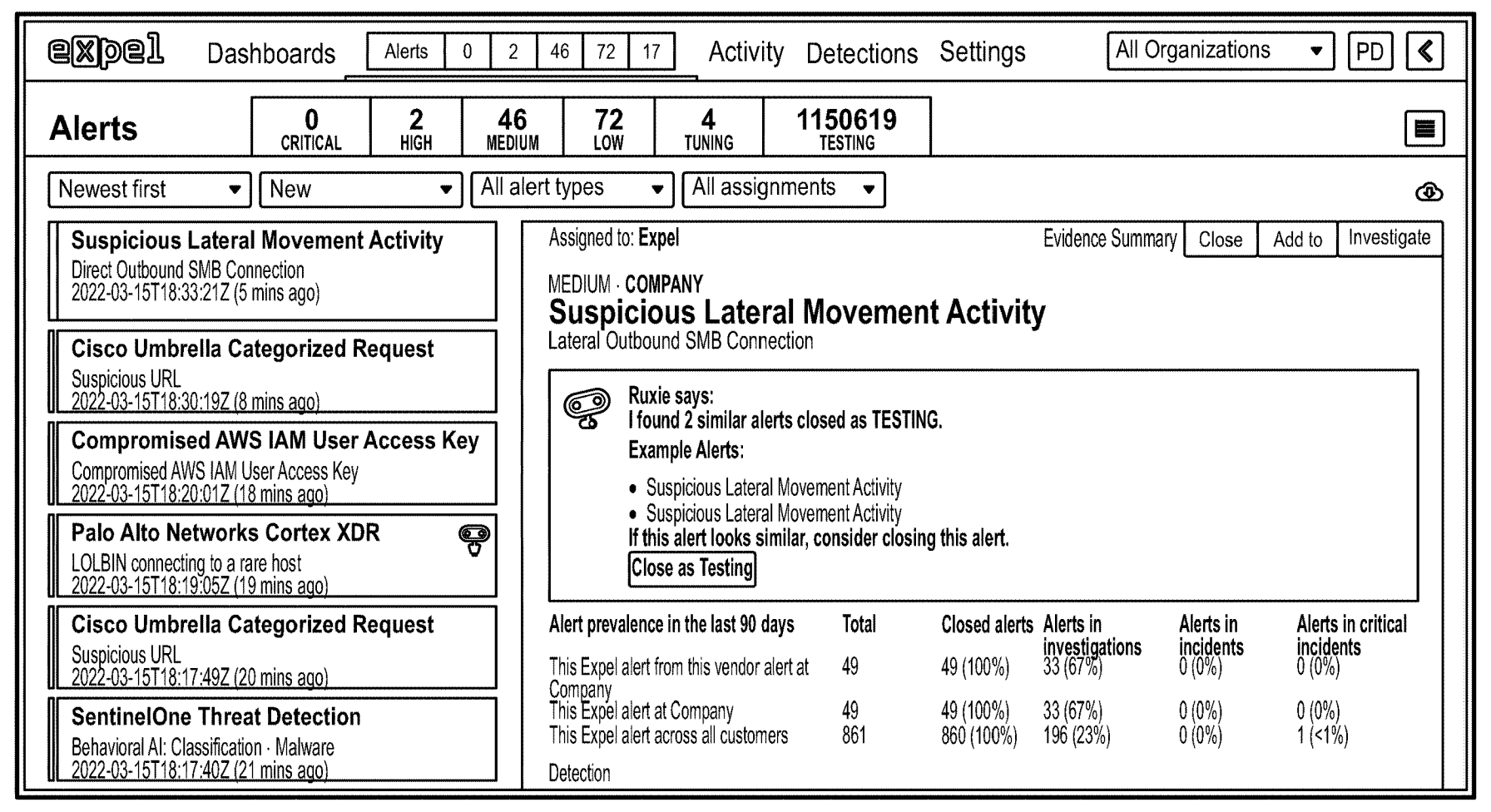

In one or more embodiments, based on or in response to identifying that a subject cybersecurity alert may be substantially similar to one or more historical cybersecurity alerts and/or events previously assessed by the cybersecurity threat detection and threat mitigation system 100, S240 may function to generate an alert similarity user interface element (e.g., homogenous alert user interface element) that may be integrally displayed within a distinct cybersecurity alert windowpane associated with the target cybersecurity alert that (e.g., visually) emphasizes to an analyst or the like that the target cybersecurity alert is substantially similar (or homogenous) to one or more historical cybersecurity alerts and/or events previously assessed by the cybersecurity threat detection and threat mitigation system 100, as shown generally by way of example in FIG. 8.

In one or more embodiments, to emphasize, expose, or bring attention (e.g., analyst focus) to the alert similarity user interface element, S240 may function to position the alert similarity user interface element proximal or substantially near an upper portion of the cybersecurity alert windowpane, display the alert similarity user interface element with a first color intensity and display the target cybersecurity alert windowpane with a second color intensity distinct from the first color intensity, and/or display the alert similarity user interface element with a first (background) color (e.g., blue) and display the target cybersecurity alert windowpane with a second (background) color distinct from the first color (e.g., grey), or the like. It shall be recognized that S240 may function to surface or emphasize the alert similarity user interface element via any suitable mechanism including, but not limited, via user interface notifications (e.g., sounds, alarms, etc.), messages, and/or the like.

In one or more embodiments, the alert similarity user interface element may include one or more text strings that may be designed for slot filling one or more tokens of text that may indicate a rationale for indicating why a target cybersecurity alert may have been identified as an alert similarity candidate. For instance, in a non-limiting example, the one or more text strings of the alert similarity user interface element that may be displayed within an exemplarily cybersecurity alert windowpane may be "Ruxie says: I found two (2) similar alerts previously closed as TESTING", as shown generally by way of example in FIG. 8.

Additionally, or optionally, in one or more embodiments, the alert similarity user interface element may function to display the corresponding collection of historical alerts underpinning the quantity of historical alerts identified by the cybersecurity threat detection and threat mitigation system as similar (or homogenous) to the subject cybersecurity alert. Alternatively, in one or more embodiments, the alert similarity user interface element may function to display a distinct alert hyperlink for each historical alert underpinning the quantity of historical alerts that was identified by the cybersecurity threat detection and threat mitigation system as similar to the subject cybersecurity alert (e.g., the alert hyperlink, when selected, may function to instantiate a user interface that includes distinct alert data corresponding to the selected alert hyperlink, thus, the selected historical alert), as shown generally by way of example in FIG. 8.

Additionally, or optionally, in one or more embodiments, the alert similarity user interface element may include a selectable user interface object, that when selected, may function to perform an alert handling action (or one or more alert handling actions) that corresponds to or aligns with one or more of the previous alert handling action(s) associated with historical alerts that was previously assessed and identified by the cybersecurity threat detection and threat mitigation system as similar to the subject cybersecurity alert, as shown generally by way of example in FIG. 8, FIG. 9, and FIG. 10.

At least one technical advantage of generating the alert similarity user interface element for a target cybersecurity alert of a cybersecurity alert queue may decrease analyst fatigue and analyst triaging time. It shall be noted, in implementations in which S240 automatically implements a proposed alert action and/or a security analyst accepts the proposed alert action for a target inbound alert, S240 may inform the system 100 and/or the method 200 to bypass an (e.g., automated) investigation workflow or interrupt a current, ongoing investigation. Thereby, preventing an unnecessary time investigating and providing alert triaging times at increased efficiencies and speed.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for accelerating a threat mitigation or disposal of a cybersecurity event, the method comprising:
identifying a target cybersecurity event comprising a plurality of distinct pieces of event data;
automatically generating, by one or more computers, a text-based cybersecurity event digest based on identifying the target cybersecurity event, wherein the automatically generating the text-based cybersecurity event digest includes:
  (a) defining a digest corpus based on selectively extracting a subset of probative data features from the plurality of distinct pieces of event data that inform a characterization of the target cybersecurity event; and
  (b) using one or more cybersecurity data arrangement heuristics to automatically compose at least one string of text based on the subset of probative data features;
computing, via a cybersecurity event hashing algorithm, a cybersecurity hashing-based signature of the target cybersecurity event based on the text-based cybersecurity event digest;
searching, based on the cybersecurity hashing-based signature of the target cybersecurity event, a hash-event data structure comprising a plurality of historical cybersecurity event hashing-based signatures corresponding to a plurality of historical cybersecurity events;
returning one or more historical cybersecurity events or historical cybersecurity alerts based on the search;
identifying, by the one or more computers, one or more cybersecurity event-specific handling actions for the target cybersecurity event based on identifying at least one threat handling action corresponding to each of the one or more historical cybersecurity events or historical cybersecurity alerts; and
executing, by the one or more computers, one or more cybersecurity event-specific handling actions or one or more cybersecurity event disposal actions that resolve or mitigate a threat of the target cybersecurity event.

2. The method according to claim 1, wherein
computing the cybersecurity hashing-based signature of the target cybersecurity event includes;
  computing a hash value for each token of the text-based cybersecurity event digest.

3. The method according to claim 1, wherein
searching the hashed event data structure includes:
  assessing the hashing-based signature of the target cybersecurity event against each of a subset of the plurality of historical cybersecurity event hashing-based signatures having a same or similar number of tokens.

4. The method according to claim 1, wherein:
one of the probative data features of the subset of probative data features includes a user-specific identifier, and the method further includes abstracting the user-specific identifier into a non-user specific identifier by generalizing one or more portions of the user-specific identifier, and wherein the text-based cybersecurity event digest includes the non-user specific identifier.

5. The method according to claim 1, further comprising:
enriching the target cybersecurity event to include one or more additional pieces of event data based on one of the plurality of distinct pieces of event data, wherein:
the text-based cybersecurity event digest includes at least one of the one or more additional pieces of event data; and
the at least one of the one or more additional pieces of event data is distinct from the plurality of distinct pieces of event data.

6. The method according to claim 1, further comprising:
displaying, via a web-accessible user interface, a representation of the target cybersecurity event that includes:
  (i) the plurality of distinct pieces of event data of the target cybersecurity event; and
  (ii) a homogenous event user interface element integrally displayed within the representation of the target cybersecurity event.

7. The method according to claim 6, wherein:
the homogenous event user interface element includes:
  (ii-a) a textual summary comprising both of (1) a numerical quantity of a total number of the one or more historical cybersecurity events or historical cybersecurity alerts returned from the search and (2) the threat handling action corresponding to each of the one or more historical cybersecurity events or historical cybersecurity alerts;
  (ii-b) a selectable hyperlink for each of the one or more historical cybersecurity events or historical cybersecurity alerts that, when selected, displays corresponding event or alert data for evaluation against the target cybersecurity event; and
  (ii-c) a selectable user interface object that, when selected, executes the one or more cybersecurity event-specific handling actions or one or more cybersecurity event disposal actions.

8. The method according to claim 7, wherein:
the homogenous event user interface element comprises one or more emphasized regions that visually emphasizes the homogenous event user interface element from portions external to the homogenous event user interface element.

9. The method according to claim 8, further comprising:
while displaying the representation of the target cybersecurity event:
  receiving an input selecting the selectable user interface object of the homogenous event user interface element; and
  in response to receiving the input, executing the one or more cybersecurity event-specific handling actions or one or more cybersecurity event disposal actions for the target cybersecurity event.

10. The method according to claim 1, wherein:
selectively extracting the digest corpus comprising the subset of probative data features is based on an event type or class of the target cybersecurity event.

11. A method for automatically generating event-specific handling instructions for accelerating a threat mitigation of a cybersecurity event, the method comprising:
automatically generating, by one or more computers, a text-based cybersecurity event digest based on a target cybersecurity event that includes a plurality of distinct pieces of event data, wherein the generating the text-based cybersecurity event digest includes:
  (a) selectively extracting a digest corpus comprising a subset of probative data features from the plurality of distinct pieces of event data that characterize the target cybersecurity event; and
  (b) automatically composing the subset of probative data features into at least one string of text based on one or more cybersecurity data arrangement heuristics;

computing, via a hashing algorithm, a cybersecurity hashing-based signature of the target cybersecurity event based on the text-based cybersecurity event digest;

performing a cybersecurity hash lookup, based on the cybersecurity hashing-based signature of the target cybersecurity event, within a hashed cybersecurity event corpus comprising a plurality of historical cybersecurity event hashing-based signatures corresponding to a plurality of historical cybersecurity events;

returning one or more historical cybersecurity events or historical cybersecurity alerts based on the cybersecurity hash lookup;

deriving, by the one or more computers, one or more cybersecurity event-specific handling actions for the target cybersecurity event based on identifying a threat handling action corresponding to each of the one or more historical cybersecurity events or historical cybersecurity; and executing, by the one or more computers, one or more cybersecurity threat mitigation actions corresponding to the one or more cybersecurity event-specific handling actions to resolve or mitigate the target cybersecurity event.

12. The method according to claim 11, further comprising:

automatically assigning, by the one or more computers, a hashing-based signature decay rate to each of the plurality of historical cybersecurity event hashing-based signatures of the hashed cybersecurity event corpus.

13. The method according to claim 12, wherein:

each of the one or more historical cybersecurity events or historical cybersecurity alerts returned from the search is within a target time span based on the hashing-based signature decay rate.

14. The method according to claim 11, wherein:

executing the one or more cybersecurity threat mitigation actions includes:
  (i) automatically routing, by the one or more computers, the target cybersecurity event to a cybersecurity event disposal queue;
  (ii) automatically assigning, by the one or more computers, a disposal rationale to the target cybersecurity event based on the threat handling action corresponding to the each of the one or more historical cybersecurity events or historical cybersecurity alerts homogeneous to the target cybersecurity event; and
  (iii) bypassing a cybersecurity investigation that includes executing an automated cybersecurity investigation workflow for the target cybersecurity event.

15. The method according to claim 11, wherein:

executing the one or more cybersecurity threat mitigation actions includes routing the target cybersecurity event to a cybersecurity incident queue prior to executing an automated cybersecurity investigation workflow for the target cybersecurity event.

16. The method according to claim 11, wherein:

one of the probative data features of the subset of probative data features comprises a file path directory that includes a user-specific identifier and a file name comprising a file number; and the method further includes:
  abstracting the user-specific identifier of the file path directory into a non-user specific identifier by normalizing the user-specific identifier; and
  abstracting the file number of the file name into a non-numerical character by normalizing the file number of the file name.

17. The method according to claim 16, wherein:

the at least one string of text includes the non-user specific identifier associated with the user-specific identifier of the file path directory and the non-numerical character associated with the file number of the file name.

18. The method according to claim 11, wherein returning the one or more historical cybersecurity events or historical cybersecurity alerts includes a plurality of distinct historical cybersecurity events;

a distinct threat handling action of a plurality of distinct threat handling action types is associated with each of the plurality of distinct historical cybersecurity events; and a distinct one of the one or more cybersecurity event-specific handling actions corresponds to each of the plurality of distinct threat handling action types.

19. The method according to claim 11, wherein:

the subset of probative data features includes a first probative data feature of a first data type, a second probative data feature of a second data type, and a third probative data feature of third data type; and the at least one string of text includes the first probative data feature of the first data type, the second probative data feature of the second data type, and the third probative data feature of third data type; and a position of the third probative data feature within the at least one string of text is before the first probative data feature and the second probative data feature in accordance with one of the one or more cybersecurity data arrangement heuristics.

20. A method for automatically generating alert-specific handling instructions for accelerating a threat mitigation of a cybersecurity alert, the method comprising:

identifying a target cybersecurity alert comprising a plurality of distinct pieces of alert data;

automatically generating, by one or more computers, a text-based cybersecurity alert digest based on the target cybersecurity alert, wherein the generating the text-based cybersecurity alert digest includes:
  (a) selectively extracting a digest corpus comprising a subset of probative data features from the plurality of distinct pieces of event data that characterize the target cybersecurity alert; and
  (b) automatically composing the subset of probative data features into at least one string of text based on one or more cybersecurity data arrangement heuristics;

computing, via a cybersecurity hashing algorithm, a cybersecurity hashing-based signature of the target cybersecurity alert based on the text-based cybersecurity alert digest;

searching, based on the distinct cybersecurity hashing-based signature of the target cybersecurity alert, an n-dimensional space comprising a plurality of historical cybersecurity alert hashing-based signatures corresponding to a plurality of historical cybersecurity alerts;

returning one or more historical cybersecurity events or historical cybersecurity alerts that are homogeneous or near-homogenous to the target cybersecurity alert based on the search;

deriving, by the one or more computers, one or more cybersecurity event-specific handling actions for the target cybersecurity event based on identifying a threat handling action corresponding to each of the one or more historical cybersecurity events or historical cybersecurity alerts; and executing, by the one or more computers, one or more cybersecurity threat mitigation actions corresponding to the one or more cybersecurity event-specific handling actions that resolve or mitigate the target cybersecurity alert.

* * * * *